Feb. 18, 1964 C. R. FISHER, JR 3,121,874

MAGNETIC DATA HANDLING SYSTEM

Original Filed May 17, 1957 3 Sheets-Sheet 1

INVENTOR.
CHARLES R. FISHER, JR.
BY H. Vincent Harsha
ATTORNEY

Feb. 18, 1964 C. R. FISHER, JR 3,121,874

MAGNETIC DATA HANDLING SYSTEM

Original Filed May 17, 1957 3 Sheets-Sheet 3

United States Patent Office 3,121,874
Patented Feb. 18, 1964

3,121,874

MAGNETIC DATA HANDLING SYSTEM

Charles R. Fisher, Jr., Pittsford, N.Y., assignor to General Dynamics Corporation, Rochester, N.Y., a corporation of Delaware Original application May 17, 1957, Ser. No. 659,883. Divided and this application Apr. 25, 1960, Ser. No. 24,407
1 Claim. (Cl. 346—74)

Figure 1:
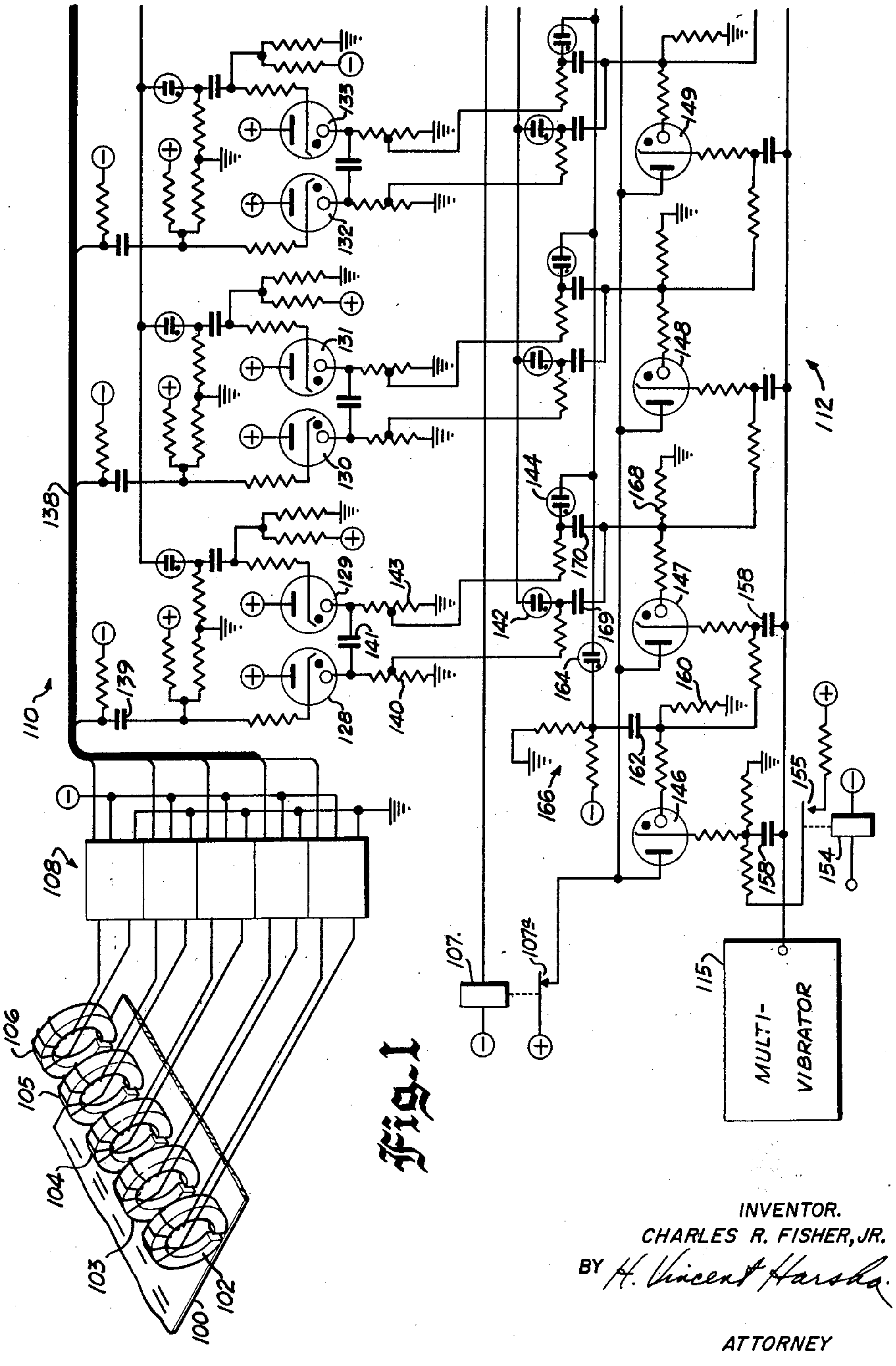

This application pertains to a data handling system and, more particularly, to a telegraph system using an intermediate bipolar magnetic storage unit. This application is a division of the copending application of Charles R. Fisher, Jr., Serial No. 659,883, filed May 17, 1957, now Patent No. 2,948,882, granted August 9, 1960, which, in turn, is a continuation-in-part of the copending application of Chales R. Fisher, Jr. and Frank A. Morris, Serial No. 634,973, filed January 18, 1957, now Patent No. 2,976,347, granted March 21, 1961.

In the last-named copending application, there is disclosed a data handling system in which a series of wheel or car reports pertaining to the contents, identification, and routing of freight cars is stored in coded form on a magnetic film together with a common item of information relating to the designation of the train formed by these freight cars. The recorded wheel report data is selectively retransmitted in coded form to different recorders in accordance with the areas in which the cars originate and are to terminate. In order to provide the common train information in conjunction with the items of data forming each of the wheel reports, the train data is transferred from the magnetic film to an endless loop of magnetic tape in a train information recorder and then retransmitted to each of the selected recorders in conjunction with the wheel report data.

One object of this invention is to provide new and improved means for storing data on a magnetic member in bipolar form.

Another object is to provide new and improved means for reproducing bipolar recordings from a magnetic member.

Another object is to provide a magnetic device for storing permutation codes in bipolar form.

A still further object is to provide signal storage means in which a simultaneous code combination is converted into a successively varying bipolar record on a magnetic member and then retransmitted in sequential form under the control of the bipolar record.

Another object is to provide a device for recording permuted mark and space signals on a magnetic member in bipolar form in which the polarity of magnetization of the record is reversed in response to each transition between mark and space conditions.

A further object is to provide a magnetic recording system using a common electronic switch in both recording and reproducing operations.

A still further object is to provide a system for producing bipolar recordings in which signals of opposed polarity derived from a bipolar record are converted into corresponding signals of a single polarity for operating electronic switching means in an output signaling means.

Another object is to provide a bipolar recording circuit including a bridge circuit, one arm of which comprises a device controlled in accordance with signals to be recorded in bipolar form.

In accordance with these and many other objects, an embodiment of the present invention includes five binary tube pairs which are selectively and simultaneously operated under the control of Baudot code combinations derived from a step-by-step driven magnetic medium. The binary tube pairs operate in conjunction with a commutator counting chain to selectively provide a series of positive pulses on a pair of mark and space output conductors in accordance with the mark and space signals or conditions stored in the binary pairs. These time spaced signals are applied to an electronic switching device having two stable states, the mark signals being applied to one input channel of the switching device and the space pulses being applied to another input channel of the electronic switch.

During data recording operations, a transducing head disposed adjacent an endless loop of continuously moving magnetic tape is connected in a bridge circuit, one leg of which comprises a transistor controlled by the electronic switch so that, for instance, when a mark pulse is applied to the electronic switch to operate the switch to one of its stable states, the magnetic tape is continuously saturated in a first polar direction. This continuous saturation of the moving magnetic tape continues during the reception of subsequent mark pulses by the electronic switch. However, when a space signal is applied to the other input channel of the electronic switch, this device changes to its other stable state and thus controls the bridge circuit to which the transducing head is connected so that the magnetic tape is thereafter continuously saturated in a second or opposite polar direction during the receipt of space pulses by the electronic switch and until such time as a mark pulse is applied to the first input channel thereof. In this manner the magnetic tape is continuously saturated in one of two polar directions in accordance with the mark and space signals applied to the electronic switch. Since the polar direction of the saturation of the moving magnetic tape changes only in response to a transition from a mark to a space or from a space to a mark condition under the control of the signals applied to the switch, varying lengths of the magnetic tape are saturated in either of the two polar directions in accordance with the number of mark and space signals consecutively applied to the input of the electronic switch.

During reproducing operations, relay means are operated which disconnect the transducing head from the output of the electronic switch and connect the transducing head to the input of a control or signaling circuit so that the transducing head is capable of supplying signals of opposite polarities in accordance with the varying directions of saturation of the magnetic tape. The control or signaling circuit includes gate means for separating the pulses of opposite polarity provided by the transducing means and for converting them into corresponding pulses of a single polarity which are selectively supplied to the input of the electronic switch. During reproducing operations, a data utilizing device, such as a receiving printer, is connected to the output of the electronic switch so that, as this switch is selectively shifted between its two stable states for varying periods in accordance with the time duration between the time spaced signals supplied by the signaling circuit, alternate signaling conditions are transmitted to the received printer in accordance with the combinational code originally stored in the binary pairs.

Figure 2:
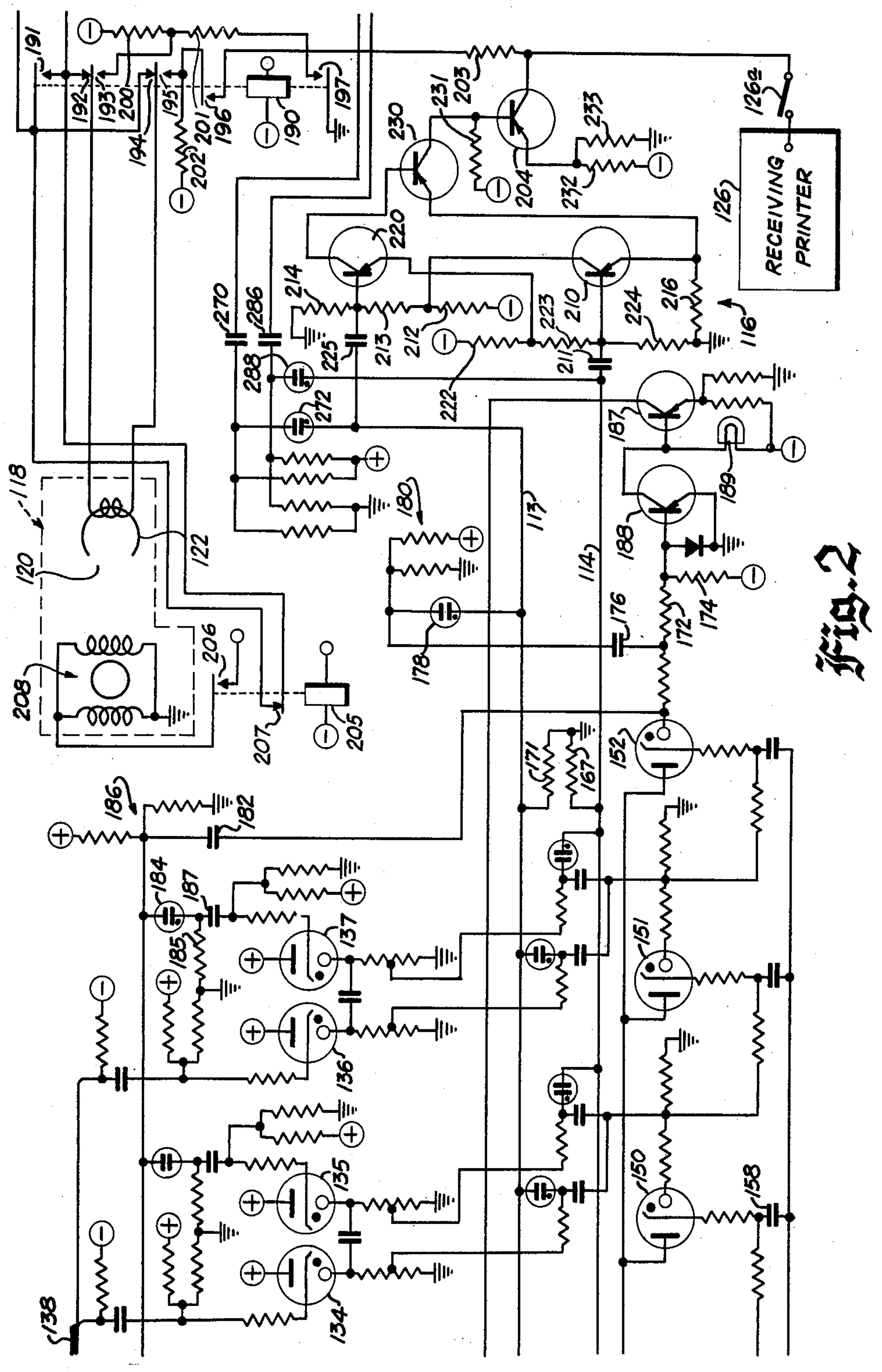
Figures 3, 4:
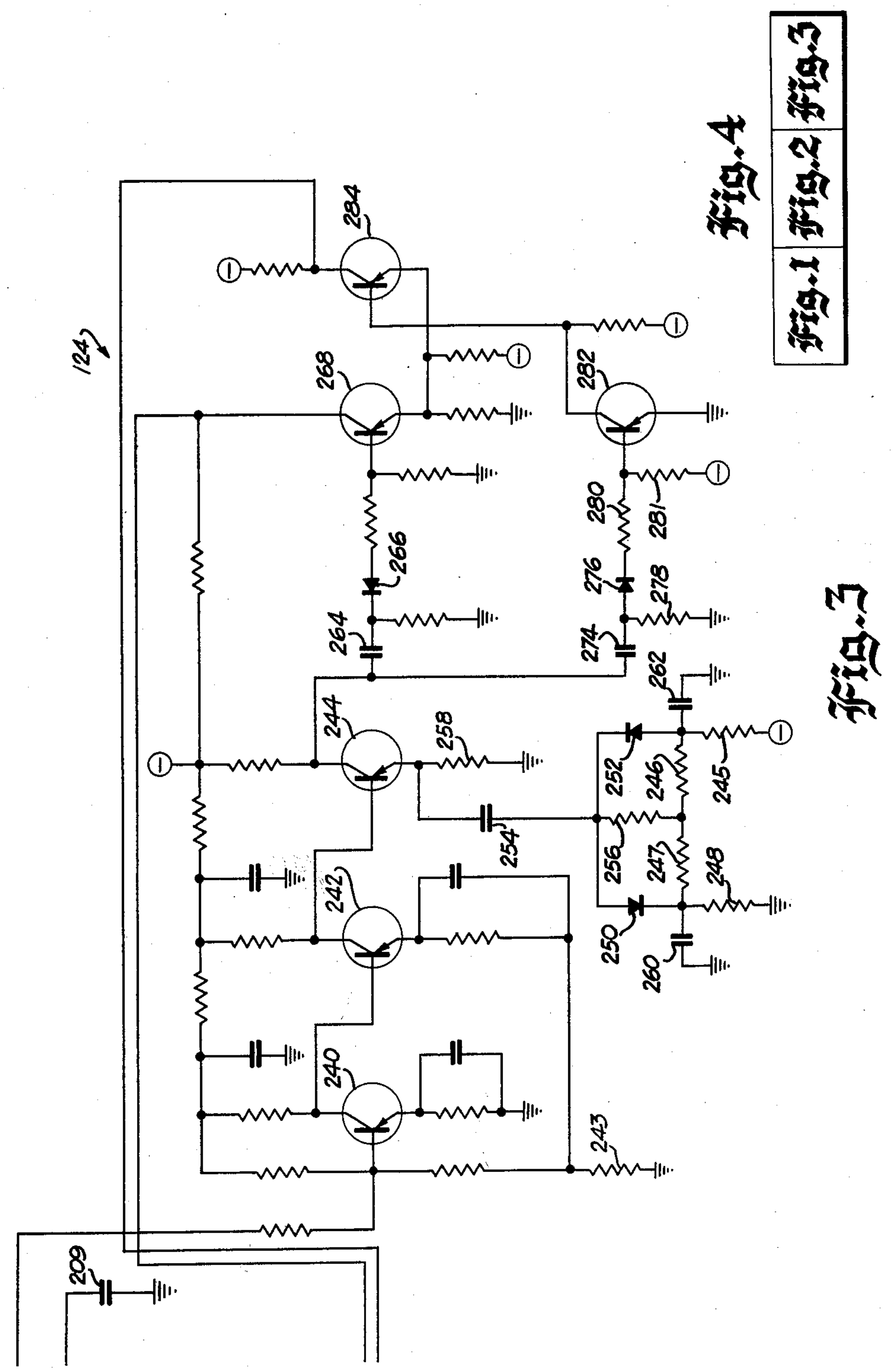

Many other objects and advantages of the present invention will become apparent from the ensuing description of an illustrative embodiment thereof in the course of which reference is made to the accompanying drawings in which:

FIGS. 1, 2 and 3 are schematic circuit drawings of a data handling system of the present invention; and FIG. 4 is a block diagram illustrating the manner in which FIGS. 1, 2 and 3 are disposed adjacent each other to form a complete circuit diagram.

In the system described in detail in the above-identified copending application, successively received Baudot code combinations are recorded in transversely aligned positions on a magentic film or tape 100 which is advanced to a reproducing or retransmitting position formed by a plurality of transducing heads 102, 103, 104, 105 and 106 by a step-by-step drive mechanism actuated by a magnet or solenoid 107. As the recorded code combinations on the tape 100 are swept past the transducing heads 102–106, each code combination is simultaneously sensed and transmitted through an amplifier, indicated generally as 108, to an electronic storage device 110 comprising five binary tube storage pairs. To provide a means for transmitting the stored code combinations in sequential form, a commutator counting ring 112 driven by a multivibrator 115 is provided. The commutator 112 and the electronic storage device 110 conjointly control a plurality of separate gate circuits to provide positive going pulses on a common mark pulse conductor 113 and on a space pulse conductor 114 in accordance with the code combinations stored in the device 110. The conductors 113 and 114 are selectively connected to the input of an electronic switching device 116 comprising a pair of transistors which are cross-connected to have two stable states of conduction. In response to a mark pulse on the conductor 113, the electronic switch 116 is switched to one of its stable states and remains in this stable state during the application of successively applied pulses to the mark pulse conductor 113 and until such time as a positive pulse is supplied to the space conductor 114. At this time, the electronic switch 116 switches to its other stable conductive state.

To provide a bipolar record of the sequentially transmitted mark and space signals, a train information recorder 118 is provided including an endless loop of magnetic tape 120 and a transducing head 122 disposed adjacent thereto. When a bipolar recording is to be made on the tape 120, the transducing head 122 is connected into a bridge circuit, one leg of which comprises a variably conductive device controlled by the electronic switch 116. When the switch 116 is in one of its stable states, the magnetic medium 120 is continuously saturated in a first polar direction and, since the tape 120 is continuously moved during a recording operation, the length of the medium saturated in this first polar direction represents the number of mark pulses consecutively applied to the input of the electronic switch 116. When the switch 116 is operated to its other stable state, the transducing head 122 is selectively energized to saturate the tape 120 in an opposite polar direction for a varying period of time depending upon the number of space pulses consecutively applied to the electronic switch 116. In this manner, the magnetic tape 120 is continuously saturated in one or the other of the two polar directions for varying lengths in accordance with the number of consecutive mark and space pulses applied to the input of the electronic switch 116 under the control of the electronic storage device 110 and the commutator 112.

To reproduce the bipolar recording provided on the tape 120, the transducing head 122 is disconnected from the bridge circuit and from the output of the electronic switch 116 and is rendered effective to supply signals of opposite polarities to a control or signaling circuit 124. The transducing head 122, in response to movement of the tape 120 adjacent thereto, supplies oppositely poled signals which are time spaced in accordance with the varying lengths of the differently saturated portions of this tape, which, in turn, is dependent upon the number of consecutively received mark and space pulses supplied to the electronic switch 116 during the recording operation. The signaling or control circuit 124 converts the oppositely poled pulses or signals provided by the transduring head 122 into corresponding signals of a single polarity which are supplied to the input of the electronic switch 116. During the reproducing operation, the output of the electronic switch 116 is connected to a utilization device, such as a receiving printer 126. Therefore, when the electronic switch 116 is shifted between its two stable conductive states in accordance with the time spaced signals of a single polarity provided by the signaling circuit 124, marking and spacing conditions on the output line extending to the receiving printer 126 are provided for varying intervals in accordance with the combination codes stored in the storage device 110. These mark and space conditions are commutated into individual mark and space pulses under the control of a commutator provided in the receiving printer or recorder 126.

As set forth above, the electronic storage device 110 includes five binary tube pairs which are simultaneously operated to store each of the successive code combinations derived by the heads 102–106 from the magnetic film or tape 100. The five binary pairs comprise a plurality of cold cathode gaseous discharge devices 128 and 129, 130 and 131, 132 and 133, 134 and 135, and 136 and 137. In each of these binary pairs, the odd designated tubes 129, 131, 133, 135 and 137 represent a space condition and normally are in a conductive condition, and the even designated tubes 128, 130, 132, 134 and 136 are each individually controlled by one of the transducing heads 102–106 to selectively store a mark signal condition. The control electrodes of the mark tubes are connected to the output of the individual amplifying sections in the amplifier 108 through a cable 138. Assuming that a mark pulse is sensed by the transducing head 102, a positive pulse is coupled through a condenser 139 to the control electrode of the mark tube 128, which control electrode is provided with an enabling bias by a voltage divider connected between B+ and ground. The application of a positive pulse through the coupling condenser 139 fires the tube 128 so that a positive voltage drop is produced across a cathode resistor 140. This positive voltage drop, together with a positive potential across a condenser 141 which is normally charged due to the normally conductive state of the space tube 129, elevates the cathode potential of the space tube 129 so that conduction therein no longer can be maintained. Accordingly, the tube 129 is extinguished. When the tube 129 is extinguished, the condenser 141 charges to a voltage equal to the drop across the cathode resistor 140. In a similar manner and simultaneously with the operation of the first binary pair controlled by the transducing head 102, the remaining binary pairs are selectively transferred to marking conditions only if pulses are sensed by the heads 103–106 adjacent the remaining related channels of the magnetic film 100.

To provide a means for selectively supplying time spaced positive output pulses in accordance with the code combination stored in the storage device 110, the cathode resistors of the mark and space tubes in each of the binary pairs are individually connected to an associated gate circuit for selectively biasing it into an open or closed condition to permit pulses supplied by the commutator counting chain 112 to be supplied to the conductors 113 and 114 in accordance with the mark and space conditions stored in the associated binary pair. More specifically, the cathode resistor 140 for the mark tube 128 is connected to one terminal of a blocking diode 142 comprising a neon lamp, whereas a cathode resistor 143 for the space tube 129 is connected to one terminal of a blocking diode 144. The other terminal of the diode 142 is connected to the mark pulse conductor 113, and the other terminal of the blocking diode 144 is connected to the space pulse conductor 114. Accordingly, when the binary pair including the tubes 128 and 129 is in a mark condition, the poistive bias supplied across the cathode resistor 140 is extended to the blocking diode 142 to condition this diode for subsequent conduction. Alternatively, if the tube 129 is in a conductive condition, the positive potential drop across the cathode resistor 143 is supplied to one terminal of the blocking diode 144 to condition this diode for transmitting a pulse to the space pulse conductor 114. Similar biasing and diode gate arrangements are provided for each of the remaining binary pairs in the storage device 110.

As set forth above, the counting chain commutator 112 sequentially supplies pulses to the gate circuits controlled by the electronic storage device 110 so that the mark and space conductors 113 and 114 are provided with a series of permuted and time spaced positive signals representing the code combination stored in the device 110. In addition, the commutator 112 also provides means for controlling step-by-step movement of the magnetic film or tape 100 and for resetting the register 110 to a normal condition. The commutator 112 includes seven cold cathode discharge devices 146, 147, 148, 149, 150, 151 and 152 which are connected for sequential operation in a counting chain. The tube 146 represents the start pulse, the tubes 147–151 represent the information bits and the tube 152 represents the stop pulse. When the commutator 112 is to be placed in operation, a start relay 154 is operated, as described in detail in the above-identified copending application, to close a pair of contacts 155. The closure of the contacts 155 supplies positive potential to a voltage dividing network to which the control electrode of the start tube 146 is connected, thereby providing an enabling bias for only this tube. The multivibrator 115 is continuously operative to supply positive pulses through a plurality of condensers 158 to the control electrodes of all the tubes 146–152. Since only the control electrode of the tube 146 is provided with an enabling potential, the first pulse supplied by the multivibrator 115 renders the tube 146 conductive to provide a positive voltage drop across a cathode resistor 160.

To provide a start signal of a space character at the beginning of each cycle of operation of the commutator 112, the positive pulse developed across the cathode resistor 160 is coupled through a condenser 162 to one terminal of a blocking diode 164, the other terminal of which is connected to the space pulse conductor 114 and to ground through a resistance 167. The one terminal of the diode 164 is connected to a fixed source of enabling bias provided by a voltage divider 166. Therefore, the positive pulse supplied by the coupling condenser 162, when added to the positive potential supplied by the divider 166, is sufficient to ionize the neon lamp 164 so that a positive pulse is supplied over the space pulse conductor 114 to a space pulse input channel of the electronic switch 116. The positive voltage drop across the cathode resistor 160 also provides an enabling bias for the control electrode of the next tube 147 in the counting chain 112 to condition this tube for being rendered conductive by the next pulse supplied by the multivibrator 115.

The tube 147 provides means for pulsing the pair of neon lamp gates controlled by the first binary pair in the storage device 110 so that a pulse is transmitted to one of the two output conductors 113 or 114 in accordance with the mark or space condition stored in this first binary pair. More specifically, when the multivibrator 115 next delivers a pulse, it is coupled through the condenser 158 to the control electrode of the tube 147 thereby rendering the tube 147 conductive to provide a positive voltage drop across a cathode resistor 168. This positive going pulse is concurrently transmitted through a pair of coupling condensers 169 and 170 to the input terminals of the blocking diodes 142 and 144 controlled by the first binary pair in the storage device 110. If, as assumed above, the tube 128 is in a conductive condition, the input terminal of the diode 142 is provided with an enabling bias near its ionizing potential so that the pulse supplied from the cathode of the tube 147 ionizes the diode 142, the other terminal of which is connected to ground through a resistor 171. Ionizing the tube 142 supplies a positive pulse to the mark pulse conductor 113 for application to the mark pulse inlet channel of the electronic switch 116. Assuming, however, that the space tube 129 rather than the mark tube 128 is in a conductive condition at this time, the positive pulse supplied by the condenser 170 ionizes the blocking diode 144 so that a positive pulse is transmitted to the space pulse conductor 114 rather than to the mark pulse conductor 113. In a similar manner, the tubes 148, 149, 150 and 151 are sequentially rendered conductive under the control of the multivibrator 115 and the preceding tube in the counting chain so that a series of time spaced and permuted mark and space pulses are transmitted to the conductors 113 and 114 in accordance with the mark and space conditions stored in the related binary pairs.

On firing the tube 151, an enabling potential is supplied to the control electrode of the seventh or stop tube 152 in the commutator counting chain 112, thereby enabling this tube to be fired by the next pulse supplied by the multivibrator 115. When the tube 152 is fired, a positive pulse developed across a pair of cathode resistors 172 and 174 is coupled through a condenser 176 to one terminal of a blocking diode 178, the other terminal of which is both connected to ground by the resistance 171 and to the mark pulse conductor 113. The blocking diode 178 is provided with an enabling potential by a voltage divider 180 so that the pulse supplied by the condenser 176 ionizes the neon lamp 178 to supply a mark or stop pulse to the conductor 113, thereby to signify the completion of one cycle of operation of the commutator 112 and to provide the conventional stop pulse.

Since the transmission of the stop pulse terminates a complete cycle of operation during which the code combination stored in the electronic register 110 has been transmitted in sequential form, the firing of this tube is also utilized to reset the electronic storage means 110 to a normal condition in which all of the odd designated space tubes are in a conductive condition and in which all of the even designated mark tubes are in a nonconductive condition. More specifically, firing the tube 152 couples a positive pulse through a condenser 182 to a plurality of blocking diodes associated with the control electrodes of the space tubes 129, 131, 133, 135 and 137. These diodes are similar to a neon lamp 184 associated with the control electrode of the space tube 137. One side of all of all these neon lamps is connected to ground through a resistance similar to a resistance 185, and the other side of all these neon lamps is connected to a positive potential provided by a voltage divider 186. Accordingly, when a positive pulse is coupled through the condenser 182, all of the neon lamps break down and supply pulses through a plurality of coupling condensers, similar to a coupling condenser 187, to the control electrodes of all of the space tubes.

Since the control electrodes of all of the space tubes are provided with a fixed enabling bias from related voltage dividers, these pulses render all of the space tubes conductive. Rendering these tubes conductive provides a positive potential drop across their cathode resistors which, together with the voltage across the cathode coupling condensers connected to conductive mark tubes, elevates the cathode potentials of the conductive ones of the mark tubes 128, 130, 132, 134 and 136 to a point at which conduction no longer can be sustained. Accordingly, all of the conductive mark tubes in the electronic storage device 110 are extinguished in response to firing the stop tube 152 in the commutator counting chain 112.

Since the code combination previously stored in the electronic storage device 110 has been retransmitted to the electronic switching circuit 116 and since this code combination has been cleared from the register device 110 by the firing of the stop tube 152, this stop tube also is used to operate the step-by-step drive mechanism for periodically advancing the magnetic film 100. More specifically, the base electrode of a transistor 188 is normally connected to negative battery through the cathode resistance 174 so as to maintain this base electrode negative with respect to its grounded emitter, thereby holding the transistor 188 in a conductive condition. However, when the tube 152 is fired under the control of the multivibrator 115, a positive voltage drop is produced across the cathode resistance 174 to render the base electrode of the transistor 188 positive with respect to its emitter so that this transistor is cut off. The termination of collector current flow to the transistor 188 through a ballast lamp 189 applies a more negative bias to the base electrode of a transistor 187, the emitter electrode of which is supplied with a fixed negative bias. The magnitude of the negative potential supplied to the base electrode of the transistor 187 is greater than that applied to the emitter electrode so that the transistor 187 now conducts to provide a current flow through the operating winding of the motor magnet 107. The operation of the solenoid or magnet 107 prepares the step-by-step drive mechanism for advancing the film 100 a single step.

In operating, the solenoid 107 also opens a pair of contacts **107*a* so that B+ potential is removed from the counting tubes 146–152, thereby restoring the counting chain commutator 112 to a normal condition. Extinguishing the tube 152 returns the base electrode of the transistor 188 to a negative potential so that the transistor 188 begins to conduct and conduction in the transistor 187 is cut off to release the motor magnet 107. The release of the motor magnet 107 closes the contacts 107*a* to again supply B+ potential to the tubes in the counting chain commutator 112 and also releases the step drive mechanism so that the magnetic tape 100 is advanced a single step relative to the reproducing heads 102–106. This movement of the magnetic film 100 sweeps the adjacent recorded code combination thereon past the heads so that the electronic storage device 100** is selectively operated to store the next code combination to be transmitted.

In this manner, the counting chain commutator 112 is operated through successive cycles of operation during which code combinations are simultaneously sensed from the magnetic film 100, stored in the electronic register device 110, and then transmitted as time spaced pulses on the conductors 113 and 114 to the input of the electronic switching means 116. When operation of the commutator 112 is to terminate, the start relay 154 is released to open the contacts 155 so that the enabling bias is removed from the control electrode of the start tube 146.

To selectively prepare or condition the train information recorder 118 for recording or reproducing operations, a pair of control relays 190 and 205 is provided. When the relay 205 is operated, a pair of contacts 206 are closed and a pair of contacts 207 are opened. The opening of the contacts 207 removes a shunt from across the input to the signaling or control circuit 124, but performs no useful function when information is being stored on the magnetic tape 120 in the recorder 118. The closure of the contacts 206, however, energizes a drive motor 208 so that the magnetic tape 120 is continuously advanced relative to the transducing head 122.

When data is to be recorded on the magnetic tape 120 under the control of the electronic switch 116, the relay 190 is operated to close a plurality of contacts 191, 193, 195, 196 and 197 and to open a plurality of contacts 192 and 194. The opening of the contacts 192 and 194 disconnects the transducing head 122 from the input to the signaling circuit 124, and the closure of the contacts 191 connects the input of this circuit to ground through a condenser 209. The remaining contacts of the relay 190 connect the transducing head 122 between the midpoints of a bridge circuit including four arms, one of which is selectively controlled by the electronic switch 116, so as to condition the transducing head 122 for providing a bipolar type of record on the magnetic tape 120.

More specifically, the closure of the contacts 197 connects a pair of series connected resistances 200 and 201 between B− and ground, and the concurrent closure of the contacts 193 connects the midpoint of the two bridge arms formed by the resistances 200 and 201 to one side of the winding for the head 122. The closure of the contacts 195 connects the other side or terminal of the winding of the head 122 to negative battery through a series resistance 202, and the closure of the contact 196 connects this same terminal or winding effectively to ground through a resistance 203 and a normally conductive output transistor 204. The magnitudes of the resistances 200, 201 and 202 are so chosen that, with the transistor 204 in a conductive state, the potential at the junction at the resistances 202 and 203 is more positive than the potential at the junction of the resistances 200 and 201. Accordingly, electron current flows through the resistance 200, the closed contacts 193, the winding of the head 122, the closed contacts 195 and 196, the resistance 203 and thence to ground through the conductive transistor 204. Electron current flow through the winding of the transducing head 122 in this direction saturates the moving magnetic tape 120 in a first polar direction representing a mark condition. Since a mark condition provides the stop signal, the provision of a continuous recording representing a continuous mark signaling condition on the magnetic tape 120 at the initiation of the recording operation and prior to the receipt of information from the counting chain commutator 112 does not adversely affect the synchronization of a receiving device when the record on the tape 120 is reproduced.

In order to provide a bipolar recording representing mark and space conditions on the magnetic medium 120, the electronic switching circuit 116 selectively controls the conductive state of the output or drive transistor 204. More specifically, incident to the initiation of each cycle of operation of the counting chain commutator 112, a positive pulse is supplied to the space pulse conductor 114 representing a start condition. This pulse is transmitted through a coupling condenser 211 to the base electrode of a transistor 210. Assuming that the transistor 210 is in a conductive condition at this time, the positive pulse supplied to the coupling condenser 211 places the base electrode of this transistor at a positive potential with respect to its emitter electrode so that conduction in the transistor 210 is cut off. The interruption of current flow in the collector circuit of the transistor 210 reduces the potential drop across a resistance 212, forming a portion of a voltage divider also including a pair of resistances 213 and 214, so that a more negative potential is applied to the base electrode of a transistor 220, thereby rendering this transistor conductive. The flow of collector current in the transistor 220 produces a positive potential drop across a resistance 222, forming a portion of a voltage divider also including a pair of resistances 223 and 224, to maintain a more positive potential on the base electrode of the transistor 210, thereby to hold this transistor in a non-conductive condition following the dissipation of the triggering impulse supplied by the conductor 114.

The termination of conduction in the transistor 210 reduces the potential drop across an emitter resistance 216 so that the potential supplied to the emitter electrode of a buffer transistor 230 becomes more positive. Further, when the transistor 220 is rendered conductive, the flow of emitter current in this transistor causes the base electrode of the buffer transistor 230 to go negative with respect to the emitter thereof so that the buffer transistor 230 conducts to carry the combined collector and base currents of the transistor 220 as well as the collector current of the transistor 230. This current flow provides a negative drop across the resistance 216 to aid in maintaining the transistor 210 in a cut off condition.

The flow of current through a collector resistance 231 of the now conducting buffer transistor 230 provides a more positive potential on the base electrode of the output drive transistor 204 so that this transistor is cut off, the emitter electrode thereof being provided with a small fixed negative bias by a voltage divider including a pair of resistances 232 and 233 connected between negative battery and ground. When the drive transistor 204 is rendered nonconductive, electron current flows through the winding of the transducing head 122 in a second direction opposite to that described above so that the magnetic tape 120 is now saturated in a second polar direction representing a space condition in accordance with the space pulse supplied by the conductor 114 to the input channel of the electronic switch 116.

More specifically, when the transistor 204 is cut off, the above described path for energizing the winding of the transducing head 122 is interrupted and the midpoint of the bridge arms formed by the resistances 202 and 203 goes to a potential which is negative with respect to the midpoint of the arms formed by the resistances 200 and 201. Therefore, electron current flows from negative battery through the resistance 202, the closed contact 195, the winding of the transducing head 122, the closed contacts 193, the resistance 201, and thence to ground through the closed contacts 197. This direction of flow of electron current is opposite to that described above and accordingly, the magnetic tape 120 is saturated in a second polar direction representing a spacing condition. This saturation of the magnetic tape 120 continues until such time as a mark pulse is applied by the conductor 113 to the now conducting transistor 220 in the electronic switch 116. Inasmuch as one or more space pulses may be coupled to the input of the electronic switch 116 and since the motor 208 remains energized to continuously advance the magnetic tape 120, a variable length of the magnetic tape 120 is saturated in this second polar direction representing a spacing condition depending upon the number of space pulses supplied to the electronic switch 116 before the application of the next succeeding mark pulse thereto.

When a mark pulse is applied to the conductor 113, it is coupled through a condenser 225 to the base electrode of the transistor 220. This pulse cuts off the transistor 220 so that the voltage drop across the resistance 222 is terminated to provide a sufficient negative bias on the base electrode of the transistor 210 to place it in a conductive state. Collector current now flows through the conductive transistor 210 to provide a positive drop across the resistance 212 so that the transistor 220 is maintained in a cut off condition. The flow of emitter current in the transistor 210 provides a negative potential across the emitter resistance 216 which is supplied to the emitter electrode of the buffer transistor 230. The application of a negative potential to this emitter electrode together with the termination of the conductive condition in the transistor 220, which causes the base electrode of the transistor 230 to go to substantially ground potential, cuts off the transistor 230 so that the termination of collector current flow therein provides a more negative potential at the base electrode at the output drive transistor 204.

The application of a more negative potential to this base electrode places the output transistor 204 in a conductive condition so that a voltage drop is produced across the series connected resistances 202 and 203. In this condition, electron current in the second direction providing the second polar saturation representing a space condition is terminated and the first described direction of electron current flow is restored so that the magnetic tape is now saturated in the first polar direction representing a mark condition. This direction of saturation of the magnetic tape 120 continues until such time as a space pulse is again coupled to the input of the transistor 210 in the electronic switch 116.

Accordingly, the electronic switch 116 including the cross-connected transistors 210 and 220 provides a switch having two stable states for selectively energizing the winding of the transducing means 122 in either of two directions so that the continuously moving magnetic tape 120 is saturated alternately in two opposite polar directions in accordance with the mark and space pulse information supplied to the input of the switch 116. Since the switch 116 is operable to change the polar direction of saturation of the tape 120 only in response to a transition from a space condition to a mark condition or from a mark condition to a space condition, the running lengths of the tape 120 which are saturated in either polar direction is determined by the number of mark or space pulses consecutively applied to the input of the electronic switch 116.

To terminate the recording of information in the train information recorder 118, the relay 205 is released to open the contacts 206 and to close the contacts 207. The opening of the contacts 207 removes the energization from the drive motor 208 so that the magnetic tape 120 is no longer moved relative to the transducing head 122. Further, the relay 190 is also released at this time to open the plurality of contacts 191, 193, 195, 196 and 197 and to close the contacts 192 and 194. The closure of the contacts 192 and 194 connects the transducing head 122 to the input of the control or signaling circuit 124, but the prior closure of the contacts 207 provides a direct shunt across the winding of the transducing means 122, thereby to prevent the inadvertent application of signals to the control circuit 124. The opening of the contacts 193, 195, 196 and 197 disconnects the bridge circuit from the head 122 so that current from the bridge no longer flows through the winding of the transducing head 122 in either direction. Further, the opening of the contacts 196 disconnects the potential source from the collector electrode of the output transistor 204, thereby to render this transistor nonconductive.

When the bipolar recording on the magnetic tape 120 is to be reproduced, the relay 205 is again operated to close the contacts 206, thereby operating the motor 208, and to open the contacts 207, thereby removing the shunt across the winding of the head 122. The movement of the tape 120 past the transducing head 122 under the control of the drive motor 208 induces a series of time spaced signals of both positive and negative polarity in accordance with the transitions in the direction of magnetic saturation of the tape 120, which signals are time spaced in accordance with the number of similar pulses applied to the input of the electronic switch 116 during recording. These signals are generated in the winding of the head 122 by the changes in the polar direction of the tape saturation representing the transitions between mark and space conditions or, more specifically, by the flux reversals providing the transitions between the mark and space conditions. It is assumed that the flux reversal from a space condition to a mark condition supplies a positive going signal to the input of the control or signaling circuit 124 and that the flux reversal produced by the transition from a mark condition to a space condition produdces a negative going pulse for application to the control or signaling circuit 124.

These alternately or oppositely poled signals are transmitted from the winding of the transducing head 122 through the closed contacts 194 to the base electrode of a transistor amplifier 240 and through this amplifier to an amplifier 242, the emitter circuit of which includes a resistor 243 connected to the base electrode biasing circuit for the input transistor 240 so as to provide degenerative or negative feedback. The output of the second cascade connected amplifier 242 is supplied to the base electrode of a buffer amplifier 244 which limits the output signals to only the peak positive going portions and the peak negative going portions thereof. It should be noted that, by virtue of the odd number of amplifying stages provided by the transistors 240, 242 and 244, the input positive signals representing mark signals appear as negative signals at the collector electrode of the transistor 244, whereas the negative space input signals appear as positive signals at the collector of the transistor 244.

In order to only permit the peak portions of these signals to be passed through the transistor 244, the emitter circuit thereof is provided with a form of limiting circuit. This circuit comprises a voltage divider including four resistances 245, 246, 247 and 248 connected between negative battery and ground. This voltage divider biases a pair of rectifiers 250 and 252 in their reverse direction. A center point on this voltage divider is connected to a bypass condenser 254 through a large value series resistance 256. In view of the high impedance in series with the bypass conductor 254 to ground, an emitter resistor 258 for the transistor 244 is normally without an effective bypass so that the input signals to the transistor cause the emitter of the transistor 244 to closely follow these pulses, thus holding the gain of this transistor virtually at unity.

When, however, the potential across the emitter resistor 258 swings far enough negative or far enough positive, the charging current for the condenser 254 produces a positive or negative drop across the series resistor 256 which biases one of the oppositely poled rectifiers 250 or 252 in its forward direction in accordance with the direction of the voltage swing across the emitter resistor 258. Rendering one of the rectifiers 250 or 252 conductive connects the bypass condenser 254 directly to ground through one of a pair of condensers 260 or 262. The emitter resistance 258 is thereafter completely bypassed and the gain of the transistor 244 rises rapidly to provide a sharp output pulse of either a negative or a positive polarity.

As indicated above, the control circuit 124 selectively drives the electronic switch 116 during reproducing operations to provide alternate mark and space signals to the receiving printer 126, but, since the electronic switch 116 is responsive to signals of only a single polarity, the circuit 124 includes means to convert the signals of opposite polarities provided by the head 122 into corresponding signals of a single polarity for operating the electronic switch 116. More specifically, a negative signal at the collector of the transistor 244 representing a transition to a marking condition is coupled through a condenser 264 to bias a normally blocked rectifier 265 in its forward direction so that the negative pulse is applied to the base electrode of a first output transistor 268. This transistor is normally cut off, but the application of a negative pulse to its base electrode drives the base electrode negative with respect to its emitter electrode so that the transistor 268 is rapidly driven to saturation to provide a positive signal at the collector electrode thereof.

This positive signal is coupled through a condenser 270 to one terminal of a blocking diode 272, and the other terminal is connected both to ground through the resistance 171 and to the mark channel input condenser 225. The one terminal of the diode 272 is also provided with a fixed positive enabling voltage close to its ionizing potential so that the positive pulse supplied by the transistor 268 ionizes the diode 272 and is transmitted by the coupling condenser 228 to the base electrode of the transistor 220. This drives the transistor 220 into a nonconductive state and places the transistor 210 in a conductive state. As described above, this operation of the electronic switch 116 renders the buffer transistor 230 nonconductive and thus places the output transistor 204 in a conductive condition so that collector current flows into the transistor 204 from a suitable voltage source in the printer 126 over a circuit including a switch 126*a* which is closed during reproducing operations to render the printer 126 responsive to control by the electronic switch 116. The electronic switch 116 remains in this condition until such time as a space pulse is applied to the input of the switch. Accordingly, a marking condition is supplied to the receiving printer 126 under the control of the bipolar recording on the magnetic tape 120 for a period of time determined by the number of consecutive mark pulses supplied during the recording operation. The receiving printer 126 includes a commutator for commutating the continuous mark condition supplied thereto by the transistor 204 into a corresponding number of one or more mark signals.

The positive going signals supplied at the output of the transistor 244 are coupled through a condenser 274 to one terminal of a rectifier 276 which is normally biased in its forward direction by a network including three resistances 278, 280 and 281 connected in series with the rectifier 276 between negative battery and ground. This voltage dividing arrangement also holds the base electrode of a transistor 282 at a slightly negative potential. Since the emitter of the transistor 282 is connected directly to ground, this transistor is normally driven to saturation. In this condition, the base electrode of a second output transistor 284 is held substantially at ground so that the transistor 284 remains normally cut off. However, when the positive signal is coupled through the condenser 274, the base electrode of the transistor 282 is momentarily driven positive with respect to its emitter to cut this transistor off. The interruption of collector current in the transistor 282 applies a large negative bias to the base electrode of the second output transistor 284, the emitter of which is supplied with a small negative potential by a voltage divider. This drives the second output transistor 284 to saturation so that a positive pulse is coupled through a condenser 286 to a blocking diode 288 comprising a neon lamp. The diode 288 is supplied with a positive enabling potential near its ionizing voltage so that the positive pulse supplied by the condenser 286 ionizes the diode 288 and is coupled through the space signal input condenser 211 to the base electrode of the transistor 210, thereby cutting off this transistor and placing the transistor 220 in a conductive state.

As described above, cutting off the transistor 210 and placing the transistor 220 in a conductive condition render the output transistor 204 nonconductive so that an open circuit condition representing a space signal is supplied to the receiving printer 126. In this manner, continuous mark or space signaling conditions are supplied to the receiving printer 126 under the control of the bipolar recording on the tape 120 in the train information recorder 118 by the use of the signaling circuit 124 and the electronic switch 116.

The blocking diodes 272 and 288 serve to prevent the positive pulses appearing on the mark and space conductors 113 and 114 from being applied to the signaling circuit 124 during a data recording operation. When a positive pulse is applied to either one of these conductors during recording it is not effective to ionize the blocking diodes 272 and 288 since the other terminal of these diodes is connected to the positive potential supplied by the voltage divider and the ionizing potential of these two neon lamps is not exceeded.

Although the above described data handling system has been described by reference to the details of an automatic telegraph system which is adapted for use in processing train and wheel report data, it should be understood that the circuits and operational techniques embodied herein are capable of general application. Accordingly, it is submitted that many other modifications and embodiments may be devised by those skilled in the art which will fall within the spirit and scope of the principles of this invention.

What is claimed as new and desired to be secured by Letters Patent of the United States is:

In a data handling system, signal generating means for supplying a permuted series of separate mark and space signals representing successive code combinations; an electronic switching circuit having two stable states and connected to said signal generating means, said switching circuit being operable to a first stable state in response to the application of a mark signal from said generating means and to a second stable state in response to the application of a space signal from said generating means; a continuously moving magnetic member; a bridge network; transducing means disposed adjacent said magnetic member and having a winding connected across said bridge network; and an output control device connected in circuit with one arm of said bridge network and controlled by said switching circuit, said control device being operable to one conductive state by the operation of said switching circuit to said first stable state to control the direction of current flow in said winding for continuously saturating said magnetic member in a first polar direction and being operable to another conductive state by operation of said switching circuit to said second stable state to control the direction of current flow in said winding for continuously saturating said magnetic member in a second and opposite polar direction.

References Cited in the file of this patent

UNITED STATES PATENTS

| | | |
|---|---|---|
| 2,416,090 | De Forest | Feb. 18, 1947 |
| 2,611,025 | Jankowski | Sept. 16, 1952 |
| 2,719,964 | McGuigan et al. | Oct. 4, 1955 |
| 2,838,675 | Wanlass | June 10, 1958 |
| 2,917,726 | Golden | Dec. 15, 1959 |
| 2,922,144 | White et al. | Jan. 19, 1960 |
| 2,996,349 | Mauch | Aug. 15, 1961 |